United States Patent
Lang et al.

[11] Patent Number: 5,880,895
[45] Date of Patent: Mar. 9, 1999

[54] EXTERNAL MIRROR ARRANGEMENT

[75] Inventors: Heinrich Lang, Ergersheim; Wolfgang Seiboth, Bad Windsheim; Albrecht Popp, Weihenzell, all of Germany

[73] Assignee: MEKRA Lang GmbH & Co. KG, Furth, Germany

[21] Appl. No.: 835,100

[22] Filed: Apr. 4, 1997

[30] Foreign Application Priority Data

Apr. 6, 1996 [DE] Germany .................. 196 13 883.3

[51] Int. Cl.⁶ .................. G02B 5/08; G02B 7/18; G02B 7/182; A47G 1/24
[52] U.S. Cl. .................. 359/841; 359/871; 359/881; 248/480; 248/900
[58] Field of Search .................. 359/841, 871, 359/872, 881; 248/477, 480, 549, 900

[56] References Cited

U.S. PATENT DOCUMENTS

| | | |
|---|---|---|
| 1,848,064 | 3/1932 | Oishei . |
| 2,458,117 | 1/1949 | Tolbert . |
| 3,371,903 | 3/1968 | Thompson . |
| 4,778,265 | 10/1988 | Fingerle et al. . |
| 5,225,943 | 7/1993 | Lupo ........................... 359/841 |

FOREIGN PATENT DOCUMENTS

| | | |
|---|---|---|
| 0379733A1 | 8/1990 | European Pat. Off. . |
| 2519918 | 7/1983 | France . |
| 2535940 | 4/1976 | Germany . |
| 62-251255 | 11/1987 | Japan . |
| 672242 | 3/1994 | Japan . |
| 1356599 | 6/1974 | United Kingdom . |
| 2048803 | 12/1980 | United Kingdom . |

OTHER PUBLICATIONS

English language Abstract for Japanese Patent No. 6–72242, Published Mar. 15, 1994.

English language Abstract for Japanese Patent No. 62–251255, Published Nov. 2, 1987.

*Primary Examiner*—Jon Henry
*Assistant Examiner*—Mark A. Robinson
*Attorney, Agent, or Firm*—Dority & Manning, P.A.

[57] ABSTRACT

An external mirror arrangement is provided including a holder for attachment to a truck vehicle body and for supporting at least one mirror. The holder includes a support arm pivotably secured to the vehicle body and a tie-bar releaseably coupled to the support arm and also attached to the vehicle body. The arrangements provides a releasable coupling that may be readily attached and reattached. A specific embodiment includes an interlocking groove and connection head providing the releasable coupling.

21 Claims, 5 Drawing Sheets

EXTERNAL MIRROR ARRANGEMENT

BACKGROUND OF THE INVENTION

The invention concerns an external mirror arrangement (i.e., a vehicle mirror assembly) for use on a commercial vehicle, and more particularly concerns an external mirror arrangement in which a mirror is held in place by a holder releasably coupled to a tie-bar.

Conventional external mirror arrangements for trucks include a holder extending from and fastened to the side of the truck body. The holder is commonly a U-shaped bracket equipped with a lower and an upper, horizontally running support arm. The bracket and the free ends thereof are swingably linked to the vehicle body so as to pivot about a vertical axis. One or more external mirrors are installed on the vertically running bottom section of the U-shaped bracket. The mirrors may be, for instance, one lightly curved convex main mirror and a strongly curved convex wide angle mirror.

A basic problem with these conventional commercial external arrangements is that, because of the relatively large dimensioning and the correspondingly heavy weight of the external mirror, it is difficult to install the holder so as to have great stability and to be vibration-free.

In order to achieve an improvement in this matter, it is common to use a tie-bar support to additionally stabilize the holder. This tie-bar support is coupled on one end to the mounting arm at an external point situated far removed from the swivelable fixation point. The tie-bar support is swingably attached to the vehicle body about one half meter behind the point where the mirror holder has been installed. Thus, with the original support arm of the mirror holder coupled to the tie-bar, a rigid triangular structural reinforcement is formed, whereby the mirror holder is stabilized.

In certain situations, the mirror holder must be folded in to the vehicle body, for instance, when the vehicle must be driven through a very narrow passage, or the truck must be laid up for a long period. By means of this folding back, the mirror is protected from damage.

Additionally, it must also be possible that the mirror holder can deflect inward when contact might be made with trucks coming the other way.

In order to meet the above stated problems, the coupling between the tie-bar and the corresponding support arm is made to be releasable. When the coupling is released, the added support for the holder is removed and the holder can swing inward toward the body.

Known releasable couplings between the tie-bar and the support arm are often heavy and troublesome to recouple. Moreover, the hinged attachment of the tie-bar to its respective body attachment is generally made in such a way that the tie-bar falls downward and remains hanging in a vertical position after release.

SUMMARY OF THE INVENTION

In accord with the above, the purpose of the invention is to so improve the now typical arrangement of external mirrors for commercial vehicles in regard to the releasability of the coupling between the tie-bar and the support arm so that the coupling, when found in a stable auxiliary support mode, can be reliably released and, further, simply and easily restored to its original position.

This purpose is achieved through the features brought forth by the claimed invention. For example, one claimed feature is an open ended, receiving groove within the support arm, running principally angularly to the longitudinal direction thereof and designed for the reception of a connection head on a tie-bar. The connection head is held in the reception groove by frictional retainment. Upon a swinging of the support arm, and according to the direction of swinging, the connection head can move out of the groove forward or backward thus releasing its coupling with the support arm. By the matching, dovetailed, interlocking fit of the cross-sections of the reception groove and the connection head, a greater frictional retainment between the coupling partners is achieved as well as a release, in the chosen degree of freedom.

For the restoration of the coupling, it is sufficient to simply slide the connection head back into the reception groove.

By means of a pretensioning of the legs of the longitudinally divided connection head, the stability of the coupling is improved.

A retention projection secures an elastic block in the connection head so that its falling out is avoided, for example, following the release of the coupling.

Through the angularly cut runway of the reception groove, a locally concentrated and therefore substantial frictional closure is brought about which engenders a substantial gripping action between the joining partners. Further, by means of this movement diagonal to the reception groove's longitudinal axis, to a limited degree, the connection piece itself can swivel therein, so that with the combined opposite swivelling of the support arm and the connection piece, during a release of the coupling—for instance by a violent impact on the mirror holder—an unhindered and protective release of the frictional connection advantageously comes about.

The arrangement of the present invention prevents a dropping of the tie-bar in the released condition of its coupling with the support arm. This eases the replacement of the coupling.

The otherwise available support base for the ramp mirror is also used for the securing of the tie-bar, thereby providing a simplified design.

Dimpled retainment projections contribute to an additional securement of the connection head which is restrained by friction in the receiving groove. By this means, the stability of the connection between the mirror holder and the tie bar support is improved.

BRIEF DESCRIPTION OF THE DRAWINGS

Further features, details and advantages of the invention are to be taken from the following description, in which an embodiment of the object of the invention is more closely observed with the aid of attached drawings. We see in.

DETAILED DESCRIPTION OF THE PREFERRED EMBODIMENTS

Figure 1:
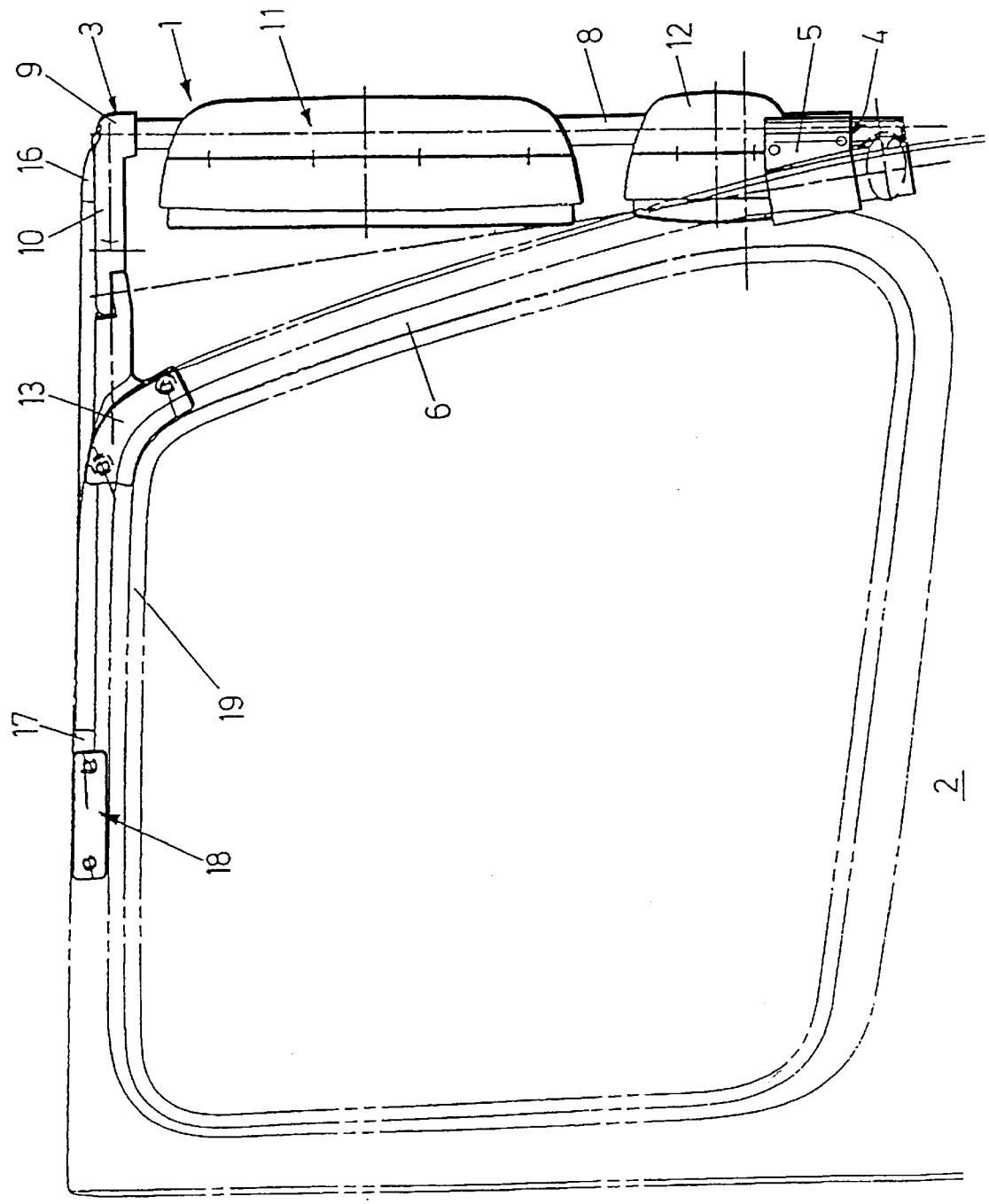
FIG. 1 a side view of an external mirror arrangement as seen from the body side, FIG. 2 a plan view of the mirror arrangement in accord with FIG. 1 with the tie-bar in a coupled condition, FIG. 3 a section along the section line III—III in accord with FIG. 2, FIG. 4 a plan view of the mirror arrangement in accord with FIG. 1 with the tie-bar in a released condition, FIG. 5 a section along the section line IV—IV in accord with FIG. 4, FIG. 6 a partial longitudinal, profile section view of a tie-bar with a support base for affixing to the body, FIG. 7 a partial sectional top view of the tie-bar, FIG. 8 a profile view of the connection head of the tie-bar in accord with the arrow direction VIII of FIG. 7, FIG. 9 a view of the connection head from the arrow direction IX—IX of FIG. 8, FIG. 10 a cross sectional view through the connection head along the section line X—X of FIG. 6 and or FIG. 8, FIG. 11 a partial plan view of a support arm of the mirror arrangement with a receiving groove in a second embodiment form, and FIG. 12 a section along the section line XII—XII in accord with FIG. 11

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment of the invention can be used on another embodiment to yield yet another embodiment. It is intended that the present invention include such modifications and variations.

Figure 2:
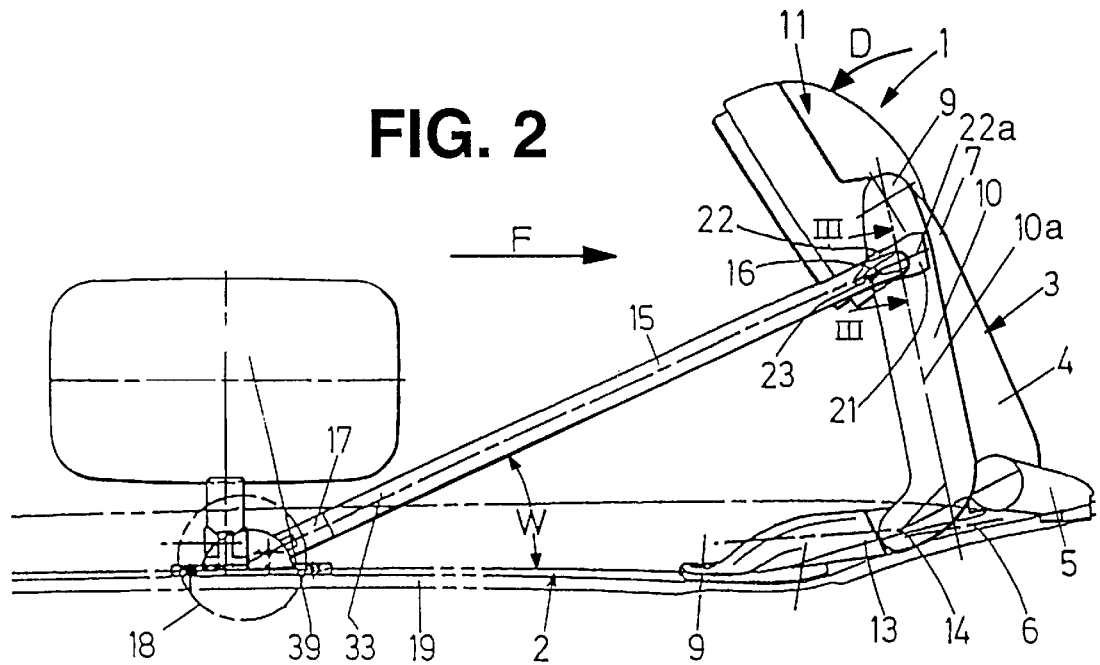
Figure 3:
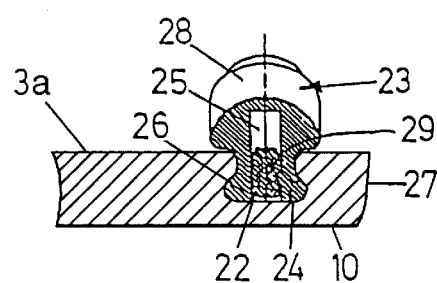

In FIGS. 1 and 2, the external mirror arrangement (i.e., vehicle mirror assembly) 1 is shown installed in the area of the driver's door 2 of a truck, shown in long/short broken lines. The main part of the external mirror arrangement is a holder 3 projecting from the cab side and designed as a U shaped support. Holder 3 has an outer surface 3a. The lower, horizontally disposed straight side of the U is swivelably linked as the lower support arm 4 to a support base 5, which is affixed at the lower part of the forward window upright 6. At the free end 7 of the lower support arm 4, a mirror bar 8 is installed. The mirror bar 8 runs vertically upward and forms the base of the holder 3, where connection is made with the free end 9 of the second upper support arm 10 of the holder 3. On the mirror bar 8 is placed a main mirror 11 and a wide angle mirror 12. Both mirrors 11 and 12 require no detailed description, since their construction and their attachment to the mirror bar 8 are conventional.

The upper support arm 10 is swivellably linked to the upper end of the forward window upright 6. The linking of the side holder 3 with its upper 10 and lower support arm 4 has been designed so that holder 3 is swingable about a vertical turning axis 14 which is slightly inclined toward the rear, and swings away from the basic position (which is shown in FIG. 2) lying against the body.

It can be seen that the linking of the support arms 4, 10 in the support bases 5, 13 are so made, that a fold-up takes place only by the occurrence of a specified turning moment on the holder 3.

The easily recognizable tie-bar 15, shown in the plan view of FIG. 2, serves to stabilize the holder 3, particularly in relation to vibration and unintended fold-up. The forward end 16 of said tie-bar is releasably coupled with the upper support arm 10, at a short distance from the free end 9 of this arm. Arm 10 has a longitudinal axis 10a. The tie-bar 15 is swingably linked in an additional support block 18 at its rear end 17, the block being installed on the upper transom bar 19 of the driver's door 2. The tie-bar 15 runs more or less horizontally at an acute angle W relative to the direction of travel F.

Figure 5:
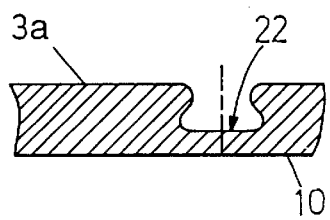

As is made clear from FIGS. 2, 3, and 6 to 10, the releasable coupling between the tie-bar 15 and the upper support arm 10 is formed by a receiving groove 22, open at both ends 20, 21, which runs in the support arm 10 angularly to the longitudinal axis of the support arm, and also by a connection head 23 in the groove which grips by frictional force and is located on the forward end 16 of the tie-rod 15. Groove 22 has a longitudinal axis 22a at an angle to arm longitudinal axis 10a. As may be inferred from FIG. 5, the receiving groove 22 and the gripping part 24 of the connection head 23 exhibit mutually matching, dovetailed cross sections. Shown in FIG. 3, the gripping part 24 conforms to the cross-sectional shape of the groove 22 and is separated by a longitudinal recess 25 into two legs 26, 27 ( see FIGS. 8 to 10). This longitudinal recess 25 extends from the actual gripping part 24 to inside the socket 28 of the connection head 23. In this longitudinal recess 25 is found an occupying, block shaped elastic block 29 (i.e., a tensioning member), which is about the length of the recess 25 and half the depth thereof The elastic block 29 is made of rubber elastic material, with which the two legs 26, 27 are pretensioned outwardly. So that the elastic block 29 is secured in the recess 25 so that the elastic block comes to rest before the open end 30 of the recess 25, the inner sidewall 31 of the leg 26 is provided with retaining (or positioning) projections 32, one on each side of sidewall 31, just before its ends, which projections impress themselves on the elastic block 29 and additionally fix said block in position.

Figure 4:
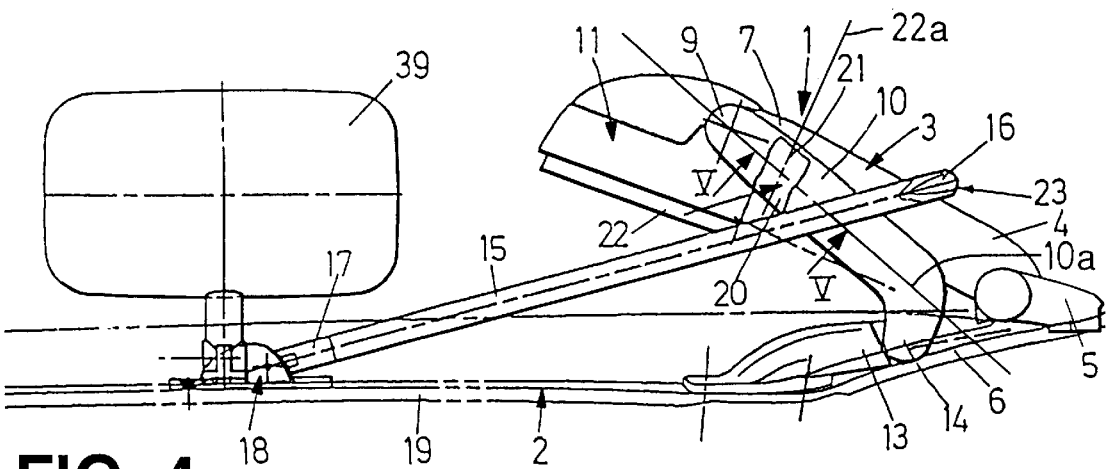

As is indicated in FIG. 4, the groove 22 of the support arm 10, narrows in cross sectional width from both its ends 20, 21 continuously to the midpoint. This means that the optimal frictional closure, and thereby the optimal coupling between the gripping part 24 of the connection head 23 and the groove 22 in the upper support arm 10, is then reached when the "waist" of the groove 22 lies at a midpoint between the two retaining projections 32, which also causes a certain holding effect to come into effect.

Moreover, the connection head 23 is an injection molded plastic part, which is pressed into the forward opening of the oval aluminum tube which is the shaft 33 of the tie-bar 15.

A swivel bar 34 is provided on the rear end 17 of the tie-bar 15 and is also made from injection molded plastic. This swivel bar 34 is likewise pressed into the shaft 33. In the support base 18, a horizontal, groove shaped recess 35 is provided in which a side piece 36 is inset into the pivoting support bar 34. In the support base 18 and in the side piece 36, aligned bearing borings 37 are provided, through which a hinge bar 38 penetrates. By means of the given design, the tie-bar 15 can only swing around substantially vertical axis 38a in the horizontal plane, that is, cannot fall downward.

Figure 6:
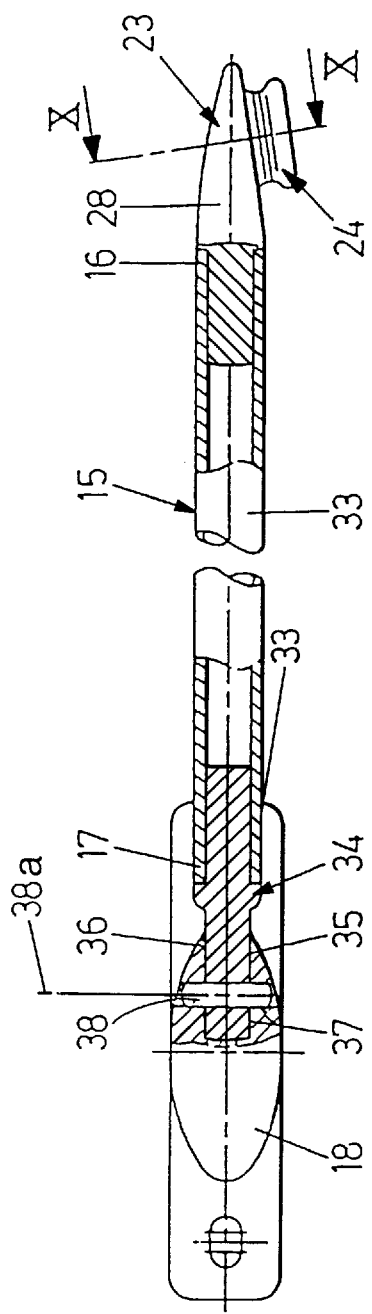
Figure 7:
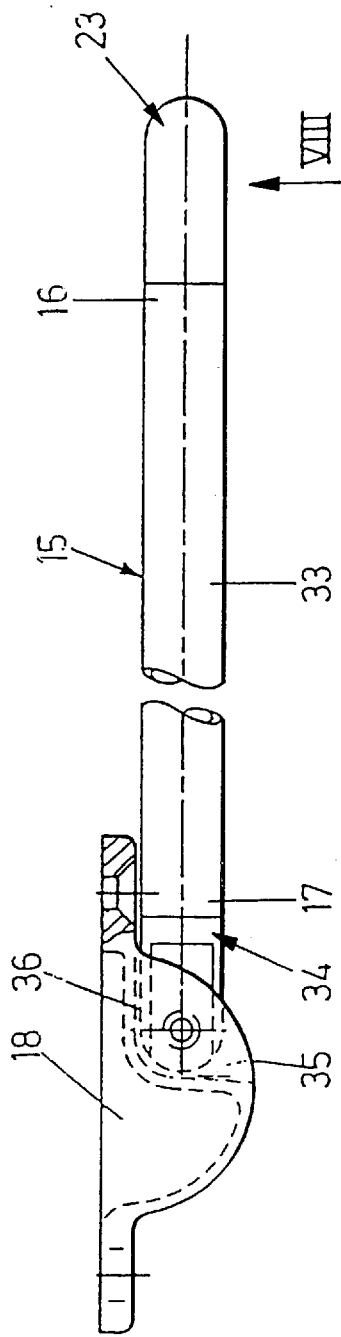
Figure 8:
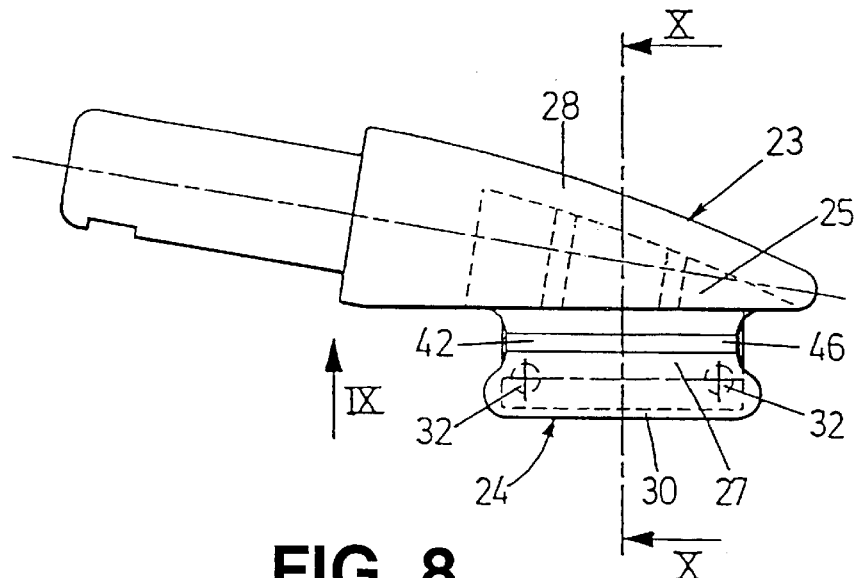
Figure 9:
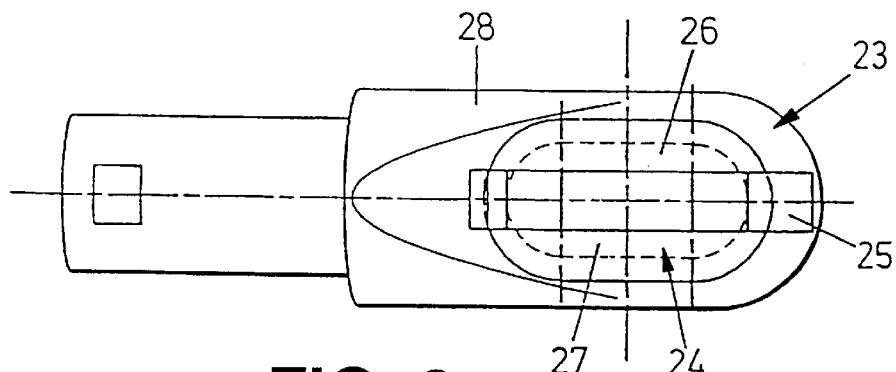
Figure 10:
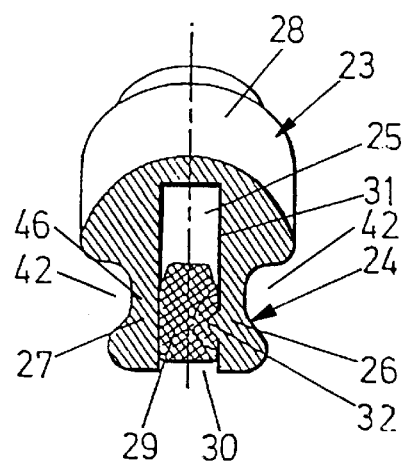

As is made plain in FIGS. 2 and 4, a so-called "ramp mirror" is installed on the support base 18, which has been omitted from FIGS. 6 and 7 in the interest of the clarity of the drawings.

By reference to FIGS. 2 and 4, the swivelling and release mechanisms between the holder 3 and the tie-bar 15 are made plain. In the base position shown in FIG. 2, as already explained, the tie-bar 15 supports and stabilizes the holder 3. As soon as a turning moment D acts on the holder 3 in a direction opposite to that of travel F, and overcomes the acting counter moment in the pivoting axis 14 of the support bases 5 and 13, as well as that resistance brought about by the frictional adherence between the connection head 23 of the tie-bar 15 and the upper support arm 10, the gripping part 24 of the connection piece 23 slides forward out of the reception groove 22, and the holder along with the mirrors 11, 12 can swivel into the folded up position as shown in FIG. 4. The tie-bar 15 then lies on the top side of the upper support arm 10.

In order to bring the external mirror arrangement 1 back into its base position, the holder 3 needs to be simply unfolded again into the arrangement position of FIG. 2 and at the same time the gripping part 24 is again slipped into the reception groove 22, which is accomplished very easily, because of the midpoint narrowing of the groove 22.

Figure 11:
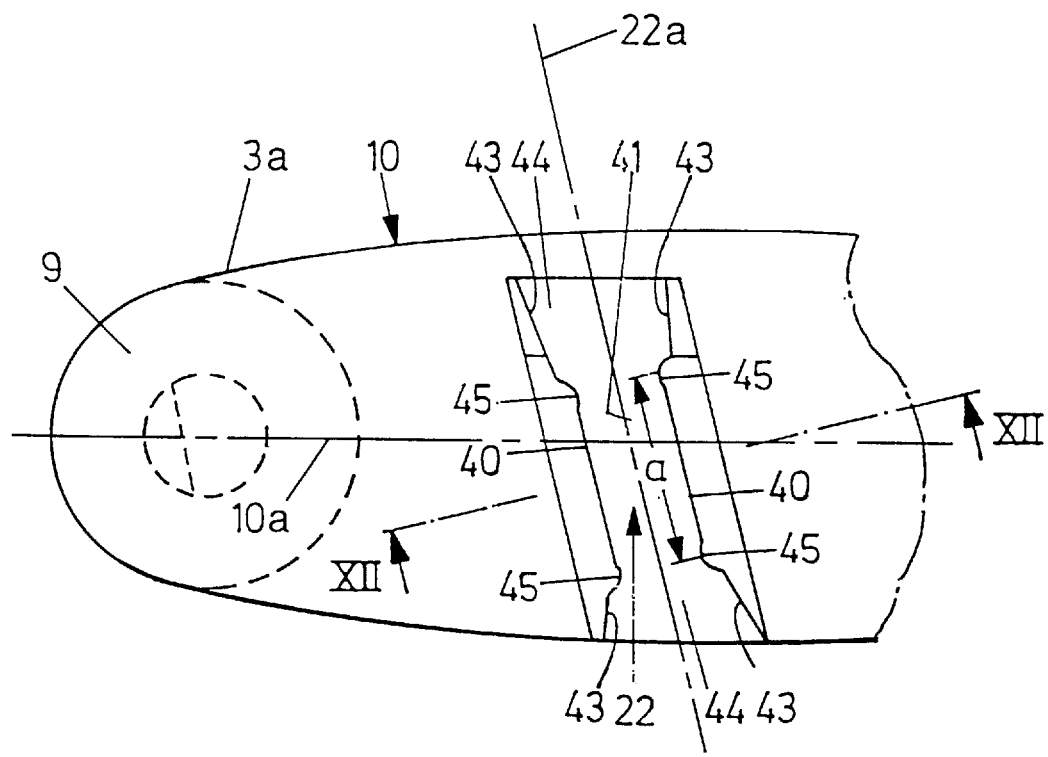
Figure 12:
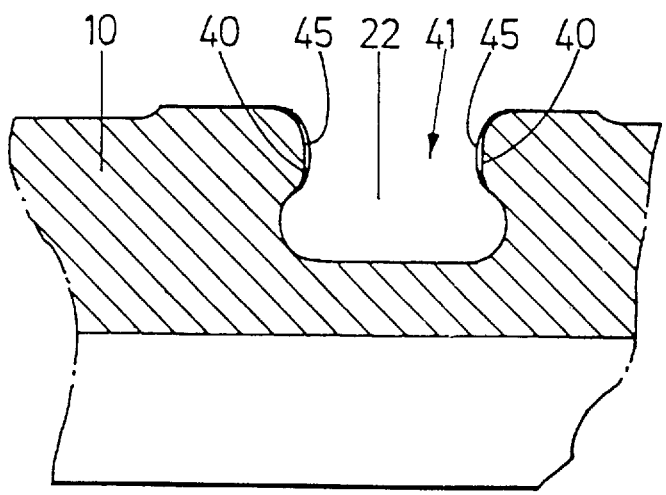

In FIGS. 11 and 12, a practical design of the receiving groove 22 is presented, which serves for additional stabilization of the friction based connection between said receiving groove 22 and the connection head 23 of the holding part 24. This design can be provided to the receiving groove 22 because of the dovetailed jointing with the side extensions 40 along the groove opening 41, which fit into the dovetail cavitation 42 (see FIG. 10). These side extensions 40 extend somewhat more than half the length of the receiving groove 22 in FIG. 11, terminating on both sides into the angular side pieces 43, so that generally, once again a tapering shape of the receiving groove 22 is brought about in accord with the embodiment example shown in FIG. 1 to 10. In the transition zone between the angular side pieces 43 and the straight sides of extensions 40+ —that is, ahead of the two ends of the receiving groove 22—the side extensions 40 are provided with dimpling retaining protrusions 45, which, however, rise only between 0.5 and 1 mm from the surface of the of the side of the retaining opening. The longitudinal extension of the retaining protrusions 45 is so laid out that, in the joined condition of the support arm 10 and the tie bar 15, the foot of curvature 46 (see FIGS. 8 and 10) of the holding part 24 interlocks between these retaining protrusions only in the least possible degree.

It will be apparent to those skilled in the art that various modifications and variations can be made in the present invention without departing from the scope and spirit of the invention. It is intended that the present invention include such modifications and variations as come within the scope of the appended claims and their equivalents.

We claim:

1. A vehicle mirror assembly for mounting a mirror to a vehicle body, the assembly comprising:
    a holder pivotally mounted to the vehicle body for supporting the mirror, the holder having an outer surface and a groove extending into the outer surface, the groove having two ends defined on the outer surface; and
    a tie-bar having two ends, one of the ends of the tie-bar being pivotally mounted to the vehicle body, and the other of the ends of the tie-bar including a connection head slidable into the groove via either of the ends of the groove, the connection head being configured so as to be frictionally and releaseably secured within the groove thereby coupling the holder and the tie-bar.

2. The vehicle mirror assembly of claim 1, wherein the groove has a substantially dovetailed cross section and the connection head includes a holding part having a mating substantially dovetailed cross section.

3. The vehicle mirror assembly of claim 1, wherein the groove has a longitudinal axis and the holder includes an arm in which the groove is disposed, the arm having a longitudinal axis extending at an angle to the groove longitudinal axis.

4. The vehicle mirror assembly of claim 3, wherein the groove varies in width between the ends of the grove.

5. The vehicle mirror assembly of claim 4, wherein the groove includes at least one extension extending from a side wall of the groove.

6. The vehicle mirror assembly of claim 5, wherein the groove includes tapered portions disposed between the extension and the ends of the groove.

7. The vehicle mirror assembly of claim 6, wherein the groove includes retaining protrusions between the extension and each tapered portion.

8. The vehicle mirror assembly of claim 7, wherein the retaining protrusions are spaced from each other by a distance so as to interlock a holding part of the connection head therebetween.

9. The vehicle mirror assembly of claim 1, wherein the connection head includes a holding part defining two legs and a recess therebetween for sliding into the groove, and further includes a tensioning member disposed in the recess for urging the legs outward into frictional engagement with the groove.

10. The vehicle mirror assembly of claim 9, wherein the connection head includes an injection molded plastic and the tensioning member includes a rubber material.

11. The vehicle mirror assembly of claim 9, wherein a positioning projection is provided on at least one of the legs for positioning the tensioning member in the recess.

12. The vehicle mirror assembly of claim 11, wherein the recess has an open end, and the positioning projection is disposed so as to position the tensioning member spaced from the open end of thee recess.

13. The vehicle mirror assembly of claim 1, wherein the holder includes a U-shaped member having two arms pivotally secured to the vehicle body.

14. The vehicle mirror assembly claim 13, wherein the groove is disposed in one of the arms of the U-shaped member.

15. The vehicle mirror assembly of claim 1, wherein the tie-bar is pivotally secured to the vehicle body via a support base, the tie-bar being pivotable around the support base about a substantially vertical axis so as to be precluded from pivoting in a substantially vertical direction.

16. The vehicle mirror assembly of claim 15, further including a mirror mounted on the support base.

17. The vehicle mirror assembly of claim 1, further including at least one mirror mounted on the holder.

18. A vehicle mirror assembly for mounting a mirror to a vehicle body, the assembly comprising:
    a U-shaped holder pivotally mounted to the vehicle body for supporting the mirror, the holder having an outer surface and a groove extending into the outer surface; and
    a tie-bar having two ends, one of the ends being pivotally mounted to the vehicle body, and the other of the ends including a connection head seatable within the groove to thereby couple the holder and the tie-bar, the connection head including two legs and a recess therebetween, and further including a tensioning member disposed in the recess for urging the legs outward into frictional engagement with the groove.

19. The vehicle mirror assembly of claim 18, wherein the groove has a substantially dovetailed cross section and the connection head includes a holding part on which the legs are located having a mating substantially dovetailed cross section.

20. The vehicle mirror assembly of claim 18, wherein the groove includes at least one pair of retaining protrusions spaced from each other by a predetermined distance so as to interlock a holding part of the connection head therebetween.

21. The vehicle mirror assembly of claim 18, wherein the tie-bar is pivotally secured to the vehicle body via a support base, the tie-bar being pivotable around the support base about a substantially vertical axis so as to be precluded from pivoting in a substantially vertical direction.

* * * * *